United States Patent [19]
Johansson

[11] 4,204,689
[45] May 27, 1980

[54] SEALING DEVICE FOR SHAFTS

[75] Inventor: Inge Johansson, Taby, Sweden

[73] Assignee: Defibrator Aktiebolag, Stockholm, Sweden

[21] Appl. No.: 901,769

[22] Filed: May 1, 1978

[30] Foreign Application Priority Data

May 2, 1977 [SE] Sweden ............................... 7705092

[51] Int. Cl.² ............................................ F16J 15/40
[52] U.S. Cl. ...................................... 277/27; 277/59; 277/71
[58] Field of Search ............... 277/3, 27, 59, 71, 72 R, 277/72 FM, 73-76, 79, 152, 153, 165

[56] References Cited

U.S. PATENT DOCUMENTS

| | | | |
|---|---|---|---|
| 2,273,129 | 2/1942 | Messinger | 277/59 |
| 2,731,282 | 1/1956 | McManus et al. | 277/59 X |
| 2,871,072 | 1/1959 | Parks et al. | 277/3 X |
| 3,268,232 | 8/1966 | Richards | 277/27 |
| 3,400,937 | 9/1968 | Crankshaw | 277/3 |
| 3,514,113 | 5/1970 | Weiswurm | 277/3 |
| 3,637,222 | 1/1972 | Wilkinson | 277/152 X |
| 3,685,840 | 8/1972 | Henry | 277/79 X |
| 3,831,950 | 8/1974 | Bentley et al. | 277/75 |
| 3,887,199 | 6/1975 | Sundqvist | 277/74 |
| 4,014,555 | 3/1977 | Jacottet | 277/3 |

FOREIGN PATENT DOCUMENTS

| | | | |
|---|---|---|---|
| 544871 | 8/1957 | Canada | 277/72 |
| 2437138 | 2/1976 | Fed. Rep. of Germany | 277/3 |
| 584569 | 1/1947 | United Kingdom | 277/79 |
| 1282968 | 7/1972 | United Kingdom | 277/153 |

*Primary Examiner*—Robert S. Ward, Jr.
*Attorney, Agent, or Firm*—Eric Y. Munson

[57] ABSTRACT

A sealing device is provided for shafts passing through the wall of a housing containing a pressurized medium of a pressure differing from that of the environment external to the housing. The sealing device includes at least one ring of packing or sealing material formed in at least one annular layer around the outer surface of the shaft. A nonrigid sleeve is mounted around the outer surface of the ring of packing material. The sealing device further includes a duct for providing a source of pressurized medium to the outer surface of the nonrigid sleeve. The forces exerted by the pressurized medium on the outer surface of the sleeve are transmitted to the layer of packing material enclosed within the sleeve so that the packing material is maintained pressed in a close sealing relationship with the outer surface of the shaft.

4 Claims, 1 Drawing Figure

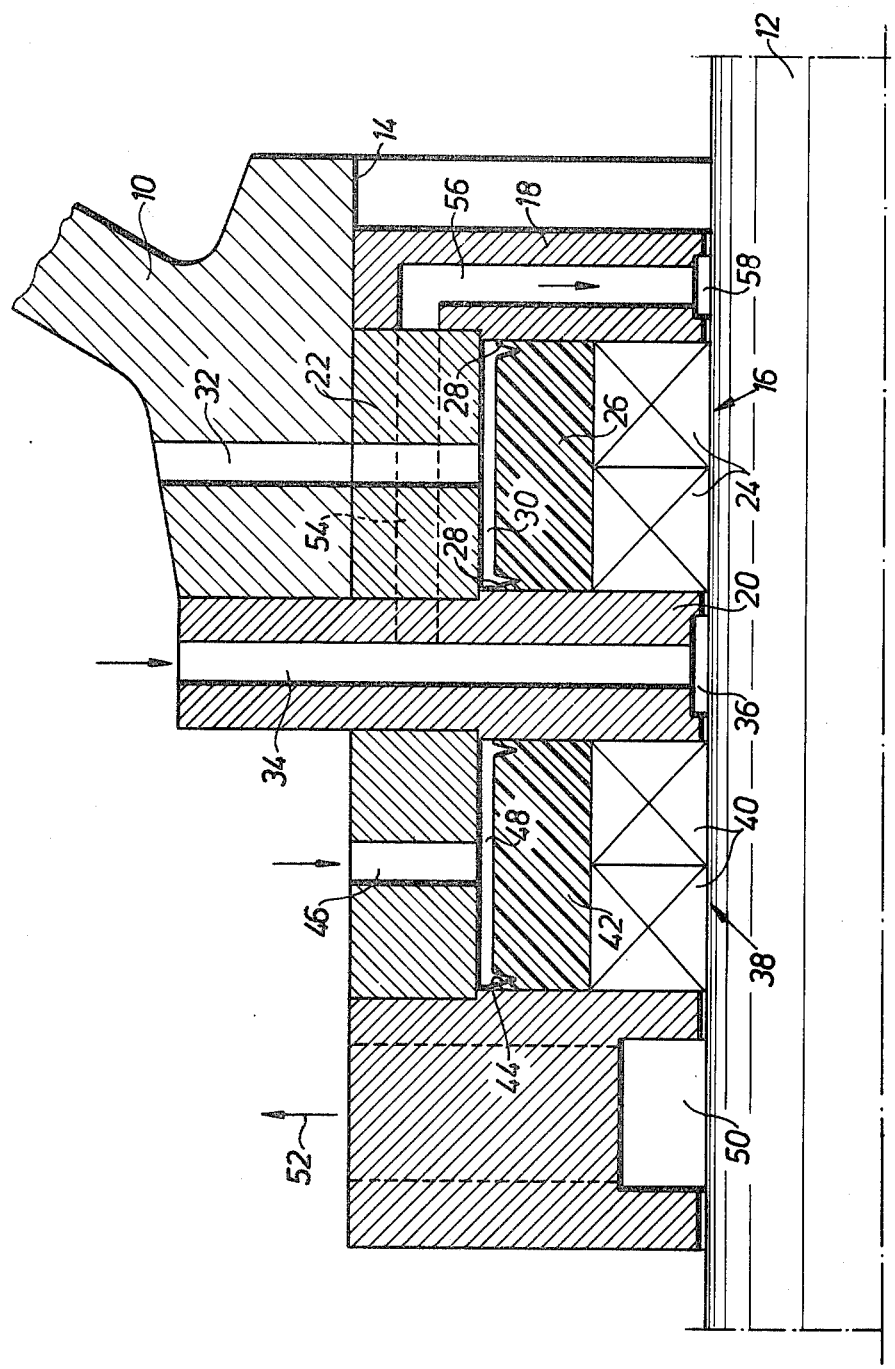

SEALING DEVICE FOR SHAFTS

BACKGROUND OF THE INVENTION

The present invention relates to a sealing device for shafts passing through the wall or housing of a machine part containing a liquid or gaseous (vapor) medium under a pressure differing from that of the environment. A common type of sealing device is the stuffing box, forming around the shaft an annular chamber in which packing strips, in the form of braid for example, are applied in rings around the shaft. These strips are pressed against the shaft by a nut or gland that closes the chamber at the side. The pressure on the packing strips is very unevenly distributed inasmuch as it is concentrated on that part of the packing strips nearest the gland, the rest of the strips being loose on the shaft. The narrow section of the packing braid subjected to the severest stress wears relatively fast, with the result that escape of the medium through the stuffing box increases rapidly, requiring repeated repositioning of the gland. In practice it is difficult to carry out these adjustments at the frequent intervals that are desirable. The purpose of the invention is the elimination of these drawbacks, which is essentially achieved by mounting around the layer of packing a sleeve which is flexible in the radial direction, and preferably made of elastic material and which on its radially exterior side is subjected to pressure through a medium, this pressure being transmitted radially inward through the sleeve to the packing layer.

The invention automatically brings about the even distribution of the pressure of the packing against the shaft along the entire length of the chamber. This pressure may be adjusted so as to prevent or minimize the leakage along the shaft.

SUMARY OF THE INVENTION

The present invention provides a device for sealing shafts passing through the wall of a housing in which a medium within the housing is of different pressure than the environment external to the housing. The sealing device includes at least one layer of sealing or packing material wrapped around at least a portion of the outer surface of the shaft. A nonrigid annular sleeve is mounted around the outer surface of the layer of packing material. Means are provided for supplying a pressurized medium to the outer surface of the annular sleeve. The pressure exerted on the nonrigid sleeve is transmitted to the layer of packing material enclosed therein so that the packing material is maintained in a close sealing relationship pressed against the shaft, and the sleeve is maintained in close relationship with the layer of packing material to prevent leakage of the medium in the housing.

BRIEF DESCRIPTION OF THE DRAWING

The drawing illustrates a sectional view of a sealing device constructed in accordance with the present invention. The sealing device is shown mounted in a portion of a refiner for lignocellulose-containing fiber material.

DETAILED DESCRIPTION OF THE DRAWING

The invention will be described below with reference to an example of embodiment thereof shown in the following drawing in the form of a longitudinal section. In the drawing, the FIGURE 10 denotes the body or wall of a refiner for lignocellulose-containing fiber material, inside which is a steam atmosphere at high pressure and equivalent temperature. Such a refiner is known per se and is only one example where the invention may be applied with advantage. A rotating shaft 12, which supports a refining disk (not shown) inside the body 10 of the refiner, passes through an opening 14 in the wall of the latter, a sealing device designed in accordance with the invention being installed between the shaft and the refiner body. The sealing device includes a stuffing box denoted generally by 16, which forms around the shaft an annular chamber bounded by two disks 18, 20 and a sleeve component 22 connecting the said disks. Inside the chamber are packing strips, e.g. in the form of braid 24, of known design, which are laid in the form of rings around the shaft in one or more layers. Applied around these is a sleeve 26 of rubber or other non-rigid and preferably elastic material. This sleeve extends the entire axial length of the chamber and is in sealing contact with the plane side faces of the walls 18, 20. For this purpose the sleeve may be provided with notches positioned so as to form ring-shaped lips 28 designed to press against the side walls so that the sleeve completely seals off the annular space 30 around the sleeve from the packing 24.

Via a duct 32 the space 30 is supplied with a pressure medium in the form of a liquid, in the present case water. The medium may also consist of a gas such as air. By adjusting the pressure of the medium inside the space 30 the sleeve 26 will be caused to press against the sealing strips 24 so that the latter bear on the shaft 12 with sufficient pressure to prevent leakage past the stuffing box.

Inside the refiner is an atmosphere of steam, with fibers freed by the refining action swirling about therein. It is desired to avoid having these fibers enter the stuffing box along with any escaping steam, and to prevent this it is a known practice to generate in a medium, usually water, a pressure exceeding the steam pressure. In the embodiment illustrated, this is achieved by supplying pressurized water via a pipeline 34 in the external wall 20 of the stuffing box leading to an annular duct 36 around the shaft 12. In this manner a counter-pressure is created in the stuffing box in opposition to the operating pressure prevailing inside the refiner housing, so that the leakage into the stuffing box of steam loaded with fibers is prevented. The medium may serve as a cooler and/or lubricant to prevent overheating of the sealing elements 24 through the friction of the rapidly rotating shaft, which is also heated by conduction from the refiner body. The lubricating effect can be improved by mixing or emulsifying paraffin, oil or other lubricants with the water.

In the embodiment illustrated, a second stuffing box 38 is mounted outside the outer plate 20 bounding the stuffing box 16 and preferably designed in the same way, i.e. with a packing layer 40 e.g. in the form of braid or similar applied next to the shaft, and a surrounding sleeve 42 e.g. of rubber or other elastic material. This sleeve is provided with lips 44 to permit a sealing pressure to be exerted on the plane side walls of the box. A pressure medium such as water is supplied via a pipeline 46 to the annular space 48 around the sleeve 42. Part of the medium fed through the pipeline 34 enters between the shaft and the sealing layer 40, there to act as a cooler and/or lubricant. The escaping medium is collected in an annular chamber 50 outside the stuffing box 38, and is drained away as indicated by the arrow 52.

It is apparent that the inward pressure generated inside the stuffing box 16, 38 has to overcome the counterpressure exerted on the packing layers 24, 40 by the medium supplied through the pipeline 34. It must be taken into account that the cylindrical outer surface of the rubber sleeve, upon which the pressure medium acts, has a greater surface area than the cylindrical inner surface of the packing layer 24 in contact with the shaft 12. This is true although the axial length of both surfaces is the same. Thus, with both media under the same pressure, a resultant pressure is obtained that acts inwards against the packing layers.

Through ducts 54, 56 the pressure medium from duct 34 can also be conducted to an annular duct 58 provided around the inner circumference of the inner wall 18 of the stuffing box 16. This results in an axially inward flow of pressure medium, in the present case water, which thus forms a barrier against the penetration of steam and fibers into the stuffing box 16 right at the first, or inner, wall of the latter. In view of the effective sealing capacity of the sealing box 16, this flow may be limited, as by placing a constriction in the duct 54, 56.

As is apparent from the above, the two liquids—the one transmitting the inwardly acting pressure in the stuffing box, and the one acting as a cooler and lubricant and preventing leakage along the shaft from the interior of the refiner—may be of the same or different types. If they consist of water, they may be fed by separate pumps or by the same pump, which may be provided with a reducing valve if the pressures are to be of different magnitudes.

Inasmuch as the packing 24, 40 pressing on the shaft is subject along its entire axial length to the same inwardly acting pressure through the non-rigid sleeve 26, 42, the packing can be retained continuously in such a position with respect to the shaft as to limit leakage along the latter to a constant, low rate. This will be independent of the inevitable amount of wear on the packing, as it is self-adjusting with a minimum of play with respect to the shaft. At the same time as the escape of medium from the interior of the refiner towards the outside is effectively counteracted, the use of a secondary pressure system of cooler and/or lubricant greatly reduces the flow of the latter medium towards the interior of the refiner or towards the exterior. This is important in a refiner of the type described above, as the leaking of water into the fibrous pulp results in higher manufacturing costs, e.g. in so-called closed whitewater systems, in the further processing of the pulp into fiberboard or similar products.

The invention is naturally not restricted to the embodiment shown, but may be varied in the widest sense within the scope of its basic concept. Thus, the sleeve 26, 42 may be axially split so that it can be mounted from the side without it being necessary to remove the shaft. As the chamber 30 is closed at the sides, while a flow of a small quantity of medium is to be maintained between the contact surfaces of the sealing element 24 and the shaft, the medium, such as water, may be supplied to these contact surfaces from the same pressure source that supplies pressure to the chamber, in which case it must be ensured that a resultant sealing pressure is obtained that acts radially inward on the sealing element.

The stuffing box of the invention can also be used in cases where there is a vacuum inside the housing or wall.

We claim:

1. In a sealing device for shafts passing through a wall separating media of different pressures, said sealing device including a packing box adapted to be mounted around a shaft, said packing box being mounted on a wall element, said packing box including a ring shaped chamber in which is disposed at least one layer of sealing material, the inner surface of said layer of sealing material being adjacent to the outer surface of said shaft, the improvement comprising a cuff or sleeve mounted around the outer surface of said layer of sealing material, said cuff or sleeve being radially flexible and being formed from an elastic material, and first means for applying a pressurized medium to the outer surface of said cuff or sleeve so that the pressure exerted thereon is transmitted radially inwardly through said cuff or sleeve to said layer of sealing material, said transmitted pressure causing said layer of sealing material to be pressed in its entire axial extension against said shaft;

the entire inner surface of said layer of packing material being shaped to conform to the outer surface of said shaft so that said layer of sealing material is maintained in a flush, contiguously abutting relationship with the outer surface of said shaft; and second means for applying a pressurized medium to the interface between the outer surface of said shaft and the inner surface of said layer of sealing material, said pressure applied by said second means being less than said pressure applied to the outer surface of said cuff or sleeve by said first means.

2. A sealing device as claimed in claim 1 wherein the pressure applied by said second means is greater than the outwardly directed pressure being exerted on the inner surface of said layer of sealing material.

3. A sealing device for shafts as claimed in claim 1 wherein said second means includes a pipe and a conduit, said conduit connecting one end of said pipe with said interface between said shaft and said layer of sealing material at one side of said packing box, the other end of said pipe communicating with a source of pressurized medium.

4. A sealing device as claimed in claim 3 further including a second pipe and a second conduit for applying said pressurized medium of said second means to a second side of said packing box, said second pipe being connected at one end to said second conduit and at its other end to said source of pressurized medium, said second conduit being connected to the interface between the inner surface of said layer of sealing material and the outer surface of said shaft at said second side of said packing box.

* * * * *